United States Patent
Huard et al.

(10) Patent No.: US 10,514,749 B2
(45) Date of Patent: Dec. 24, 2019

(54) METHOD FOR ADJUSTING AT LEAST ONE OPERATING POINT OF AT LEAST ONE INTEGRATED CIRCUIT OF A SYSTEM ON A CHIP, AND CORRESPONDING SYSTEM ON A CHIP

(71) Applicants: STMicroelectronics (Crolles 2) SAS, Crolles (FR); STMicroelectronics (Alps) SAS, Grenoble (FR); STMicroelectronics SA, Montrouge (FR)

(72) Inventors: Vincent Huard, Le Versoud (FR); Silvia Brini, Fontanil (FR); Chittoor Parthasarathy, Grenoble (FR)

(73) Assignees: STMicroelectonics (Crolles 2) SAS, Crolles (FR); STMicroelectronics (Alps) SAS, Grenoble (FR); STMicroelectronics SA, Montrouge (FR)

( * ) Notice: Subject to any disclaimer, the term of this patent is extended or adjusted under 35 U.S.C. 154(b) by 36 days.

(21) Appl. No.: 15/467,614

(22) Filed: Mar. 23, 2017

(65) Prior Publication Data

US 2018/0039320 A1 Feb. 8, 2018

(30) Foreign Application Priority Data

Aug. 3, 2016 (FR) ...................................... 16 57536

(51) Int. Cl.
*G06F 1/26* (2006.01)
*G06F 1/32* (2019.01)
(Continued)

(52) U.S. Cl.
CPC ............ *G06F 1/3262* (2013.01); *G06F 1/324* (2013.01); *G06F 1/3206* (2013.01);
(Continued)

(58) Field of Classification Search
CPC ...... G06F 1/3262; G06F 1/3296; G06F 1/324; G06F 1/3206; G06F 15/7814;
(Continued)

(56) References Cited

U.S. PATENT DOCUMENTS

| 8,154,335 B2 | 4/2012 | Chawla et al. |
| 2004/0061518 A1 | 4/2004 | Watanabe et al. |

(Continued)

FOREIGN PATENT DOCUMENTS

EP 2988141 A1 2/2016

OTHER PUBLICATIONS

INPI Search Report and Written Opinion for FR 1657536 dated Mar. 30, 2017 (7 pages).

*Primary Examiner* — Xuxing Chen
(74) *Attorney, Agent, or Firm* — Crowe & Dunlevy

(57) ABSTRACT

A system on a chip includes at least one integrated circuit that is configured to operate at least at one operating point. A monitoring circuit acquires at least the cumulative duration of activity of the at least one integrated circuit. An evaluation circuit establish at least one instantaneous state of aging of the at least one integrated circuit based on the at least one cumulative duration of activity. An adjustment circuit operates to change the at least one operating point on the basis of the at least one state of aging of the at least one integrated circuit.

33 Claims, 3 Drawing Sheets

(51) Int. Cl.

| | |
|---|---|
| *G06F 1/3234* | (2019.01) |
| *G06F 11/30* | (2006.01) |
| *G06F 11/32* | (2006.01) |
| *G06F 15/78* | (2006.01) |
| *G06F 1/3206* | (2019.01) |
| *G06F 1/324* | (2019.01) |
| *G06F 1/3296* | (2019.01) |

(52) U.S. Cl.
CPC ........ *G06F 1/3296* (2013.01); *G06F 11/3024* (2013.01); *G06F 11/3048* (2013.01); *G06F 11/3051* (2013.01); *G06F 11/327* (2013.01); *G06F 15/7814* (2013.01); *Y02D 10/126* (2018.01); *Y02D 10/172* (2018.01)

(58) Field of Classification Search
CPC ............. G06F 11/3024; G06F 11/3048; G06F 11/3051; G06F 11/327
See application file for complete search history.

(56) References Cited

U.S. PATENT DOCUMENTS

| | | |
|---|---|---|
| 2009/0228727 A1 | 9/2009 | Tamura et al. |
| 2010/0188115 A1 | 7/2010 | von Kaenel |
| 2011/0181315 A1 | 7/2011 | Krishnan |
| 2011/0314312 A1 | 12/2011 | Naffziger et al. |
| 2013/0117582 A1 | 5/2013 | Satyamoorthy et al. |
| 2016/0077569 A1* | 3/2016 | Aizik ...................... G06F 1/324 713/340 |

\* cited by examiner

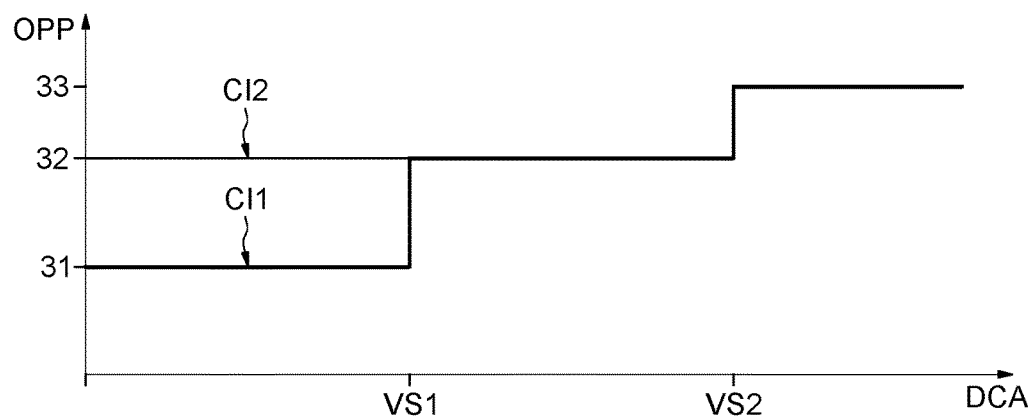
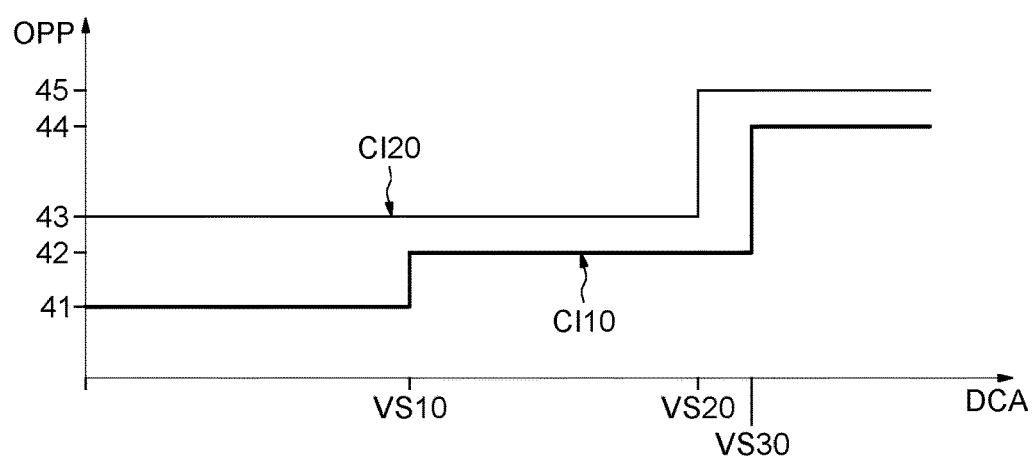
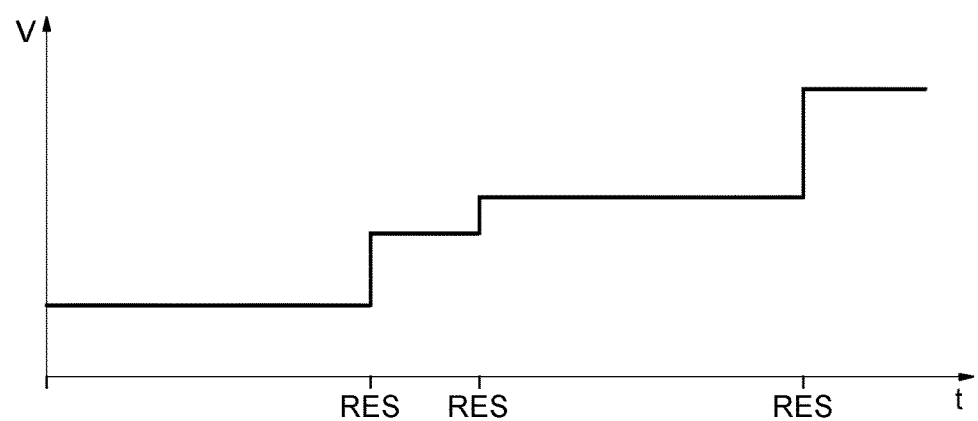

METHOD FOR ADJUSTING AT LEAST ONE OPERATING POINT OF AT LEAST ONE INTEGRATED CIRCUIT OF A SYSTEM ON A CHIP, AND CORRESPONDING SYSTEM ON A CHIP

PRIORITY CLAIM

This application claims the priority benefit of French Application for Patent No. 1657536, filed on Aug. 3, 2016, the disclosure of which is hereby incorporated by reference in its entirety.

TECHNICAL FIELD

The embodiments and applications herein relate to systems on chips, and more particularly to a device and a method for adjusting a supply voltage, in the context of the reliability management of such systems.

BACKGROUND

In present-day systems on chips (commonly known by the acronym SOC for "System on Chip"), the aging of the electronic components is anticipated in the design of said systems.

Aging is usually compensated by supplementing the supply voltage with an excess, or compensation, voltage, so that aged components continue to operate satisfactorily in a "used" product. For example, an excess of 40 mV for a power supply of 150 mV is usually provided after the initial use of such a system on a chip.

This compensation therefore results in excess energy consumption after the initial use, which is a drawback in applications where energy efficiency is prized, for example in the case of a weak battery or where the aim is to minimize energy loss.

This loss of performance may be even more serious if the same design of a system on a chip is used for different mission profiles. A mission profile is a model of use corresponding to various constraints that will affect the system on a chip. By way of illustration, a system designed for industry will be more intensively used than a system designed for a car, which will itself be more intensively used than a system used by private individuals.

The systems on chips that can be used in various mission profiles are therefore designed to withstand the most constraining model, and this represents a loss of competitiveness because there is poor compliance with the conventional energy values (referred to as PPA for "Power Purchase Agreement") for less constraining mission profiles.

Thus, the systems for managing the aging of electronic components present a problem of power supply optimization, in a compromise between performance and reliability, allowance being made for the limitations of systems on chips including said components.

It would therefore be desirable to resolve this problem by providing adaptive compensation for the aging of systems on chips.

Regarding the adaptive adjustment of the voltage and frequency of a system on a chip, U.S. Pat. No. 8,154,335 (incorporated by reference) describes a system on a chip in which a supply voltage is reduced and/or a clock frequency is increased in order to provide conditions of use within acceptable margins, said margins being generated by a critical path replica circuit. This prior art system also describes an increase in the voltage and/or a reduction in the frequency for preventive purposes if said acceptable operating margins of the conditions of use are exceeded.

The solution proposed in U.S. Pat. No. 8,154,335 is adapted to occasional variations in the operation of the system on a chip, but does not make allowance for the aforementioned long-term problems of excess power supply and aging.

SUMMARY

It is therefore proposed, according to some embodiments and applications, that the supply voltage and/or the operating frequency of the components be adjusted dynamically during the life of a system on a chip, on the basis of states of aging of said components.

In other words, a real state of aging of the system on a chip is measured, for example in order to apply the compensation voltage at an optimal instant and at an optimal value.

A state of aging is a data element representing the use that has been made of a given component, at a given instant, since its initial use and application.

The components in question may preferably be integrated circuits forming the logic of a calculation unit such as a processor, which are usually more sensitive to aging than other components, for example passive components, of systems on chips.

On the other hand, integrated circuits, or certain functional units of integrated circuits, operate optimally at a given operating performance point, for a given state of aging.

An Operating Performance Point (OPP) is an entity used by those skilled in the art to denote a good compromise in the parameters applied to a component, for example between its supply voltage and its operating frequency. This operating performance point (OPP) is referred to below by the more concise term "operating point".

Thus, according to one aspect, a method is proposed for adjusting at least one operating point of at least one integrated circuit of a system on a chip, comprising: a monitoring step, comprising the acquisition of at least one cumulative duration of activity of at least one integrated circuit, an evaluation step, comprising the establishment of a state of aging of said at least one integrated circuit on the basis of said cumulative duration of activity, and a step of adjustment of said at least one operating point of said at least one integrated circuit on the basis of its state of aging.

According to one embodiment, the system on a chip comprises a first integrated circuit configured to operate at a first operating point, and a second integrated circuit configured to operate at a second operating point which is less constraining than the first operating point. The adjustment step comprises an adjustment, advantageously by stages, of the operating point of the first integrated circuit to the second operating point when the state of aging of the first integrated circuit, equal to the cumulative duration of activity of the first integrated circuit, exceeds a first threshold value.

An operating point of an integrated circuit which is less constraining than another operating point is, for example, an operating point of which at least some parameters, such as the operating voltage and frequency, have values enabling the integrated circuit to operate with greater tolerance to operating hazards, such as those due to the aging of the integrated circuit, than would be the case with the values of the same parameters associated with the other operating point.

The adjustment step may also comprise an adjustment, advantageously by stages, of the operating point of the first and second integrated circuits to a third operating point which is less constraining than the second operating point, when the states of aging of the first and second integrated circuit, which are equal to the cumulative durations of activity of the first and second integrated circuit respectively, exceed a second threshold value.

In other words, this embodiment corresponds to making first operating points, for example, called critical operating points, of the system on a chip, that is to say those that can withstand a lower voltage and/or a higher frequency than other operating points called regular operating points, shift to a second regular operating point at a specified instant, which is set during the design of said system on a chip.

According to another embodiment, the system on a chip comprises a first integrated circuit configured to operate at a first operating point. The adjustment step comprises an adjustment, advantageously by stages, of the operating point of the first integrated circuit to a second operating point which is dedicated to the first integrated circuit and is less constraining than the first operating point, when the state of aging of the first integrated circuit, equal to the cumulative duration of activity of the first integrated circuit, exceeds a first threshold value.

In the case of a system on a chip comprising a second integrated circuit configured to a third operating point, the adjustment step advantageously comprises an adjustment, by stages for example, of the operating point of the second integrated circuit to a fourth operating point which is dedicated to the second integrated circuit and is less constraining than the third operating point, when the state of aging of the second integrated circuit, equal to the cumulative duration of activity of the second integrated circuit, exceeds a second threshold value.

In other words, this embodiment corresponds, for example, to an adjustment of certain operating points of the system on a chip, performed during the life of said system on a chip according to a schedule and values specified during the design of said system on a chip.

This adjustment and this schedule may, for example, be optimized for different mission profiles on the basis of the requirements represented by these profiles. The adjustments of the dedicated operating points are then determined in advance during the design of the system on a chip.

According to one embodiment, the monitoring step further comprises the acquisition of a supply voltage applied to said at least one integrated circuit, and the evaluation step comprises the establishment of a state of aging of said at least one integrated circuit on the basis of the cumulative duration of activity, and on the basis of at least one supply voltage previously applied to said at least one integrated circuit.

The adjustment step may comprise an adjustment by stages of said at least one operating point of said at least one integrated circuit to at least one other operating point dedicated to said at least one integrated circuit, less constraining than said at least one operating point.

In other words, this embodiment corresponds, for example, to a "customized" adjustment of certain operating points of the system on a chip, on the basis of the aging caused by the duration of its activity and its voltage supply.

Advantageously, the evaluation step and the adjustment step are executed on each start-up of the system on a chip.

According to another embodiment, the monitoring step comprises the acquisition of at least one physical parameter representing the use of said at least one integrated circuit. The evaluation step comprises the determination of at least one instantaneous state of aging of said at least one integrated circuit respectively, on the basis of said at least one physical parameter, and the calculation of at least one operating margin of said at least one integrated circuit, comprising the comparison of said at least one instantaneous state of aging with a presumed state of aging, and the adjustment step comprises the adjustment of said at least one operating point with allowance for said at least one respective operating margin.

Such an embodiment is described in greater detail in co-pending application for patent entitled "METHOD FOR ESTIMATING AN OPERATING PROFILE OF AN INTEGRATED CIRCUIT OF A SYSTEM-ON-A-CHIP, AND CORRESPONDING SYSTEM-ON-A-CHIP", U.S. patent application Ser. No. 15/468,798 filed Mar. 24, 2017, now U.S. patent Ser. No. 10/302,693 issued May 28, 2019, which claims priority to French Application for Patent No. 1657535 filed Aug. 3, 2016 (incorporated by reference).

The evaluation step and the adjustment step may advantageously be executed periodically in real time during the operation of the system on a chip.

On the other hand, said acquisition, in the monitoring step, may advantageously be executed continuously during the operation of the system on a chip.

The monitoring step may further comprise the sending of a warning signal, in case of a hardware malfunction, wherein the adjustment step comprises the adjustment of the operating point of said at least one integrated circuit to a secure operating point if a warning signal is sent.

According to another aspect, a system on a chip is proposed, comprising at least one integrated circuit configured to operate at one operating point at least, comprising a monitoring circuit configured to acquire at least the cumulative duration of activity of said at least one integrated circuit, an evaluation circuit configured to establish at least one instantaneous state of aging of said at least one integrated circuit respectively, comprising said at least one cumulative duration of activity, and an adjustment circuit configured to adjust at least one operating point on the basis of said at least one state of aging of said at least one respective integrated circuit.

According to one embodiment, a first integrated circuit is configured to operate at a first operating point and a second integrated circuit is configured to operate at a second operating point, less constraining than the first operating point, and the adjustment circuit is configured to adjust, advantageously by stages, the operating point of the first integrated circuit to the second operating point when the state of aging of the first integrated circuit, equal to the cumulative duration of activity of the first integrated circuit, exceeds a first threshold value.

The adjustment circuit may be configured to adjust, advantageously by stages, the operating point of the first and second integrated circuits to a third operating point which is less constraining than the second operating point, when the states of aging of the first and second integrated circuit, which are equal to the cumulative durations of activity of the first and second integrated circuit respectively, exceed a second threshold value.

According to one embodiment in which a first integrated circuit is configured to a first operating point, the adjustment circuit is configured to adjust, advantageously by stages, the operating point of said at least one first integrated circuit to a second operating point, dedicated to the first integrated circuit and less constraining than the first operating point, when the state of aging of the first integrated circuit, equal to the cumulative duration of activity of the first integrated circuit, exceeds a first threshold value.

According to one embodiment in which a second integrated circuit is configured to a third operating point, the adjustment circuit is configured to adjust, advantageously by stages, the operating point of the second integrated circuit to a fourth operating point, dedicated to the second integrated circuit and less constraining than the third operating point, when the state of aging of the second integrated circuit, equal to the cumulative duration of activity of the second integrated circuit, exceeds a second threshold value.

According to one embodiment, the monitoring circuit is also configured to acquire a supply voltage applied to said at least one integrated circuit, and the evaluation circuit is configured to establish at least one state of aging of said at least one integrated circuit respectively, on the basis of the cumulative duration of activity, and on the basis of the supply voltages previously applied to said at least one integrated circuit.

The adjustment circuit may be configured to adjust by stages said at least one operating point of said at least one integrated circuit to at least one other operating point dedicated to said at least one integrated circuit, less constraining than said at least one operating point.

Advantageously, the evaluation circuit and the adjustment circuit are configured to establish the instantaneous state of aging and to adjust said operating point on each start-up of the system on a chip.

According to one embodiment, the monitoring circuit is configured to acquire at least one physical parameter representing the use of said at least one integrated circuit, the evaluation circuit is configured to determine at least one instantaneous state of aging of said at least one integrated circuit respectively, on the basis of said at least one physical parameter, and to calculate at least one operating margin of said at least one integrated circuit respectively, by comparing said at least one respective instantaneous state of aging with a presumed state of aging, and the adjustment circuit is configured to adjust said at least one respective operating point on the basis of said at least one respective operating margin.

The evaluation circuit and the adjustment circuit may be configured to calculate said at least one operating margin and to adjust said at least one operating point periodically in real time.

Advantageously, the monitoring circuit is configured to execute said acquisition continuously during the operation of the system on a chip.

The monitoring circuit may further comprise break circuits associated with at least one integrated circuit, comprising critical path replicas and/or in-situ sensors configured to send a warning signal to the adjustment circuit in case of hardware malfunction, and in which the adjustment circuit is configured to adjust the operating point of said at least one integrated circuit to a secure operating point when a warning signal is sent to it.

According to another aspect, an electronic apparatus is proposed, including a system on a chip as defined above.

BRIEF DESCRIPTION OF THE DRAWINGS

Other advantages and features of the invention will be apparent from a perusal of the detailed description of applications and embodiments which are not limiting in any way, and the appended drawings, in which:

FIGS. 3 and 4 show graphs of OPP versus DCA;

FIG. 5 shows a graph of voltage versus time;

DETAILED DESCRIPTION

Figure 1:
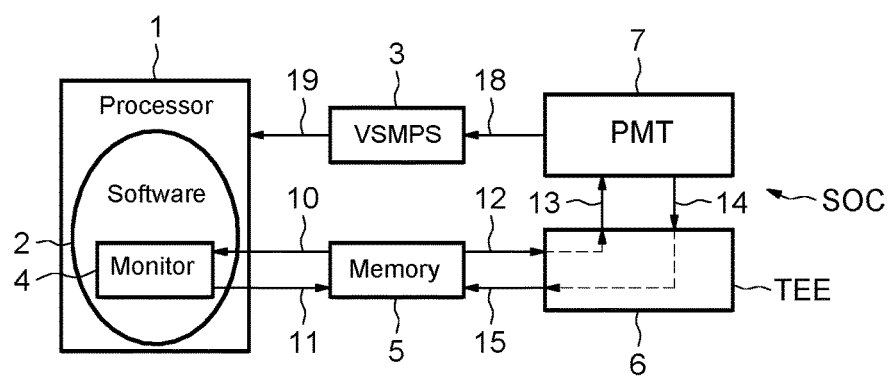
FIG. 1 shows schematically and in a simplified manner an embodiment of a system on a chip SOC.

FIG. 1 shows schematically and in a simplified manner an embodiment of a system on a chip SOC comprising a processor 1 configured to execute software means 2.

The system on a chip comprises, in a usual way, passive components and active components such as integrated circuits, which for the sake of simplicity are not shown.

The integrated circuit, forming the processor 1 for example, is configured to operate optimally at an operating point which is natural to it.

An operating point, or "Operating Performance Point" (OPP), also referred to as an operating point, is an entity used by those skilled in the art to denote a good compromise between the parameters applied to a component.

An operating point is, for example, defined by at least one supply voltage and a clock frequency.

The supply voltages are generated by a switched mode power supply stage 3 (for example, a Voltage Switched Mode Power Supply (VSMPS) and are then distributed 19 in the system on a chip SOC, and more particularly in the integrated circuits of the processor 1.

The processor 1 has a monitoring circuit 4 configured to acquire the activity time of at least one integrated circuit at a given operating point, and to read 10 and update 11 a cumulative duration of activity of said at least one integrated circuit in a non-volatile memory 5.

At the start of a period of activity of an integrated circuit, the monitoring circuit 4 reads the preceding value of the cumulative duration of activity of said integrated circuit in the memory 5, and measures the time elapsed during said period of activity.

After the period of activity, the monitoring circuit adds the measured activity time to the preceding value of cumulative duration of activity and records the new value of cumulative duration of activity in the memory 5.

The monitoring circuit 4 may, for example, be implemented in software form in the processor 1.

The system on a chip SOC comprises a secure processor 6, commonly known as a Trusted Execution Environment (TEE).

The secure processor 6 is a secure processor or a secure area of a processor which is not easily accessed by a user or a program external to the system on a chip SOC as such.

A parameterization circuit (PMT) 7 is configured to control the various physical parameters which enable the system on a chip SOC to operate.

The parameterization circuit 7 is, notably, capable of controlling the power supply stage 3, and is thus capable of modifying the operating point of an integrated circuit of the system on a chip SOC, by modifying its supply voltage.

The parameterization circuit 7 is, for example, implemented as a software module incorporated into an independent microcontroller.

An evaluation circuit is configured to establish a state of aging on the basis of said cumulative duration of activity.

In a first embodiment, the evaluation circuit is formed by the interaction of the secure processor 6 and the parameterization circuit 7. In fact, the secure processor is used to read 12 the cumulative duration of activity and to transmit 13 the cumulative duration of activity to the parameterization circuit 7.

More precisely, the secure processor 6 is used here as a reliable intermediary, making it possible, for example, to avoid external corruption of the memory 5 or of the parameterization circuit 7.

The parameterization circuit 7 establishes a state of aging on the basis of said cumulative duration of activity. In this embodiment, the state of aging of an integrated circuit is directly its cumulative duration of activity at a given operating point.

The state of aging is then transmitted 14 to the secure processor 6 which writes 15 the state of aging to the memory 5.

In this embodiment, if the state of aging of an integrated circuit, that is to say its cumulative duration of activity at an operating point defined as critical, reaches a threshold value, then the parameterization circuit 7 controls 18 the power supply stage 3 so as to modify 19 the operating point of the integrated circuit in question.

The parameterization circuit 7 and the power supply stage 3 thus form an adjustment circuit capable of adjusting the operating point of an integrated circuit with allowance for its state of aging.

An operating point defined as critical has, for example, a lower voltage and/or a higher frequency than other operating points, called regular.

Figure 2:
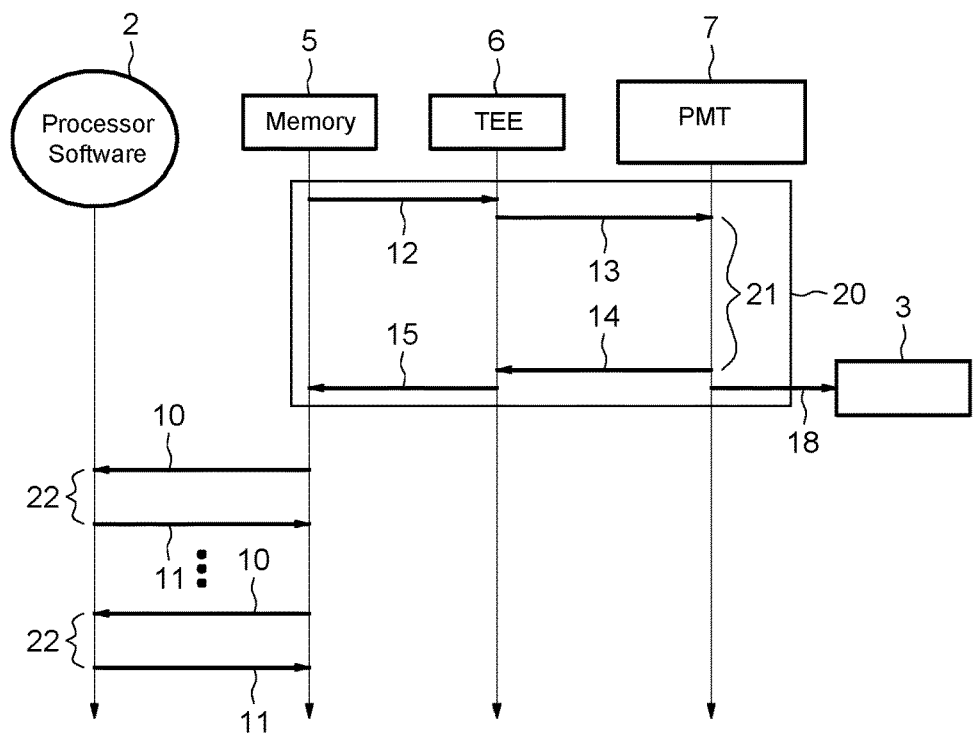
FIG. 2 shows a timing diagram of various operations described in relation to FIG. 1.

FIG. 2 shows a timing diagram of various operations described in relation to FIG. 1. The four downward vertical arrows represent the passage of time.

The reading 12 of the cumulative duration of activity and its transmission 13 to the parameterization circuit 7, followed by a calculation time 21, the transmission 14 and the writing 15 to the memory 5 of the state of aging, together with the control 18 of the power supply stage 3, are executed in a preliminary phase 20.

The calculation time 21 is the time required for the calculation of the state of aging of an integrated circuit, together with, if necessary, the calculation of the optimal adjustment of an operating point, and more particularly the voltage generated by the power supply stage 3 for this operating point.

The preliminary phase 20 is executed on each start-up of the system on a chip SOC.

The reading 10 and updating 11 of the cumulative duration of activity of the integrated circuit in a non-volatile memory 5 are carried out continuously during the use of the system on a chip, whenever the respective integrated circuit is active 22.

The adjustment of the operating points of the integrated circuits of the system on a chip SOC is carried out on each start-up of the system SOC.

FIG. 3 shows an embodiment of a first variant of this application in the form of a graph on which the cumulative duration of activity DCA is shown on the horizontal axis and a scale OPP representing the operating points is shown on the vertical axis.

The scale OPP may represent, for example, the supply voltage of the operating points represented by it.

A first integrated circuit CI1 is configured to operate at a first critical operating point 31, then, when the cumulative duration of activity DCA of this integrated circuit CI1 at this critical operating point 31 reaches a first threshold value VS1, the adjustment circuit (references 3 and 7) sets this integrated circuit CI1 to a regular operating point 32.

The regular operating point 32 is, for example, an operating point of a second integrated circuit CI2.

Similarly, when the cumulative duration of activity of the second integrated circuit CI2 and the first integrated circuit CI1 at this regular operating point exceeds a second threshold value VS2, the adjustment circuit sets these circuits CI1, CI2 to a third operating point 33, which is less constraining than the preceding operating points 31, 32. The expression "less constraining operating point", used here and throughout the detailed part of the description, is taken to mean that the operating point of an integrated circuit which is less constraining than another operating point is, for example, an operating point of which at least some parameters, such as the operating voltage and frequency, have values enabling the integrated circuit to operate with greater tolerance to operating hazards, such as those due to the aging of the integrated circuit, than would be the case with the values of the same parameters associated with the other operating point.

The threshold values of cumulative duration of activity may be, for example, 3 years of activity for a critical operating point (VS1), or 7 years of activity for a regular operating point (VS2).

Briefly, this variant can be used to switch from first critical operating points of the system on a chip to second regular operating points at specified instants, which are set at the time of the design of said system on a chip.

This makes it possible, for example, to use the maximum performance of some integrated circuits of the system on a chip at the start of the life of said system and to maintain reliable operation of the same integrated circuits after they have aged.

As many "stages" as may be necessary may be provided, each stage corresponding to a change of operating point after a threshold value of cumulative duration of activity has been exceeded.

FIG. 4 shows an embodiment of another variant of this application in the form of a graph having the same construction as that shown in FIG. 3.

In this variant, the second operating points may be different operating points from the regular operating points applied to other integrated circuits of the system on a chip.

These second operating points may, for example, be set during the design of the system on a chip to optimize the operation of the integrated circuits, after a period of aging equal to a first threshold value of cumulative duration of activity.

This corresponds to an adjustment of certain operating points performed during the life of said system on a chip according to a schedule and optimal values dedicated to this integrated circuit and specified during the design of said system on a chip.

More precisely, a first integrated circuit CI10 is configured to operate at a first critical operating point 41, then, when the cumulative duration of activity DCA of this integrated circuit CI10 at this critical operating point 41 reaches a first threshold value VS10, the adjustment circuit sets this integrated circuit CI10 to a dedicated operating point 42, less constraining than the initial critical operating point 41.

The dedicated operating point 42 is not necessarily an operating point of a second integrated circuit CI20.

When the cumulative duration of activity DCA of the first integrated circuit CI10 at this dedicated operating point 42 reaches another threshold value VS30, the adjustment circuit sets this integrated circuit CI10 to a dedicated operating point 45, which is itself less constraining than the preceding dedicated operating point 42.

Similarly, when the cumulative duration of activity of a second integrated circuit CI20 at a third operating point 43 exceeds a second threshold value VS20, the adjustment circuit sets these circuits CI20 to a fourth operating point 44, which is less constraining than the preceding operating point 43.

In the preceding variants, the adjustment of an operating point is carried out on the first restart of the system on a chip, after the cumulative duration of activity of an integrated circuit has exceeded the corresponding threshold value.

This adjustment and this scheduling may advantageously allow for the mission profile for which the system on a chip SOC is designed.

The mission profile of a system on a chip may also be configured by a user, for example by being initialized before the first use or modified during the life of the system on a chip.

According to another embodiment, the state of aging of an integrated circuit is the result of a calculation allowing for the cumulative duration of activity, the values of the supply voltage provided to this integrated circuit during its previous activity, and its previous state of aging.

The data relating to the previous activities are read in the memory 5.

This calculation is based on a physical and/or empirical model of the aging of each of the integrated circuits.

The adjustment of operating point may advantageously allow for not only the state of aging of the integrated circuit, but also the temperature of the system, the constraints to which the system is subjected, for example those due to current draws, or the precision of the power supply stage, in the form of fixed constants corresponding to a mission profile.

The mission profile may, for example, be provided during the design of the system on a chip, or may be configured by a user.

Additionally, in this embodiment, the adjustment of the operating point is carried out on each start-up of the system on a chip SOC, and the value of the supply voltage of the adjusted operating point is calculated on the basis of a predetermined formula which is a function of the cumulative duration of activity and the preceding state of aging.

Said calculation is executed by the parameterization circuit 7.

The new applied voltage and the new state of aging are then recorded in the memory 5, by means of the secure processor 6, and will form the data relating to previous activities for a subsequent calculation of the value of a supply voltage.

On the first start-up, the supply voltage is set to a default value.

The supply voltage will then increase by stages during the life of the system on a chip, on the basis of the use made of said system on a chip.

FIG. 5 shows an example of the variation of said supply voltage, in the form of a graph showing time t on the horizontal axis and the supply voltage V on the vertical axis. The horizontal axis is, notably, marked out by restart events RES of the system on a chip SOC.

In other words, in this embodiment, a monitoring circuit, implemented in software form by the processor 1 for example, records the time spent by integrated circuits at critical operating points, and a dynamic adjustment of the operating points is carried out on the next restart of the system on a chip.

Thus, on each start-up of the system on a chip, the voltage applied to an integrated circuit, preferably an integrated circuit forming a calculation unit, is calibrated on the basis of the uses made of this integrated circuit after the first operation of the system on a chip.

Figure 6:
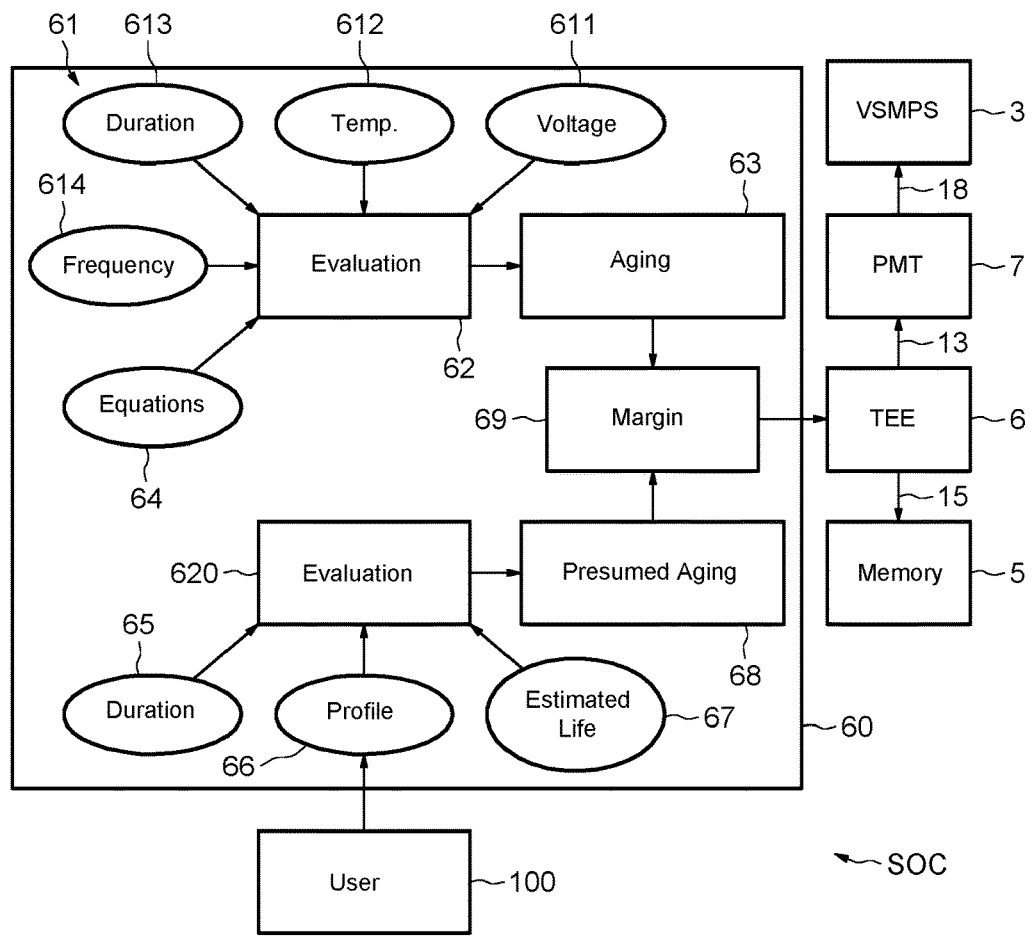
FIG. 6 shows a system on chip with a calculation unit configured to execute certain functions, for example defined in software executed by a processor.

FIG. 6 shows an embodiment described in co-pending application for patent entitled "METHOD FOR ESTIMATING AN OPERATING PROFILE OF AN INTEGRATED CIRCUIT OF A SYSTEM-ON-A-CHIP, AND CORRESPONDING SYSTEM-ON-A-CHIP", U.S. patent application Ser. No. 15/468,798 filed Mar. 24, 2017, now U.S. patent Ser. No. 10/302,693 issued May 28, 2019, which claims priority to French Application for Patent No. 1657535 filed Aug. 3, 2016 (incorporated by reference).

In this embodiment, the physical parameters 61 representing the use of an integrated circuit are acquired, by means of in-situ sensors for example, assigned to the integrated circuits concerned.

The physical parameters may be, for example, the voltage 611, the temperature 612, the duration of activity 613 of the integrated circuit, or its operating frequency 614.

An evaluation circuit 62, implemented in software form in a processor 60 for example, is configured to determine an instantaneous state of aging 63 of the integrated circuit.

The instantaneous state of aging is calculated on the basis of equations 64 modeling the attrition of an integrated circuit on the basis of said measured physical parameters 61.

On the other hand, a second evaluation circuit 620, again implemented in software form in a processor 60 for example, is configured to determine a presumed state of aging 68, depending solely on a cumulative duration of activity 65 and a mission profile 66.

The two evaluation circuits 62 and 620 are separate in this representation, but may be formed by a single evaluation circuitry, for example one implemented in software form in the processor 60.

The presumed state of aging 68 corresponds to an estimated state of aging associated with a mission profile 66 multiplied by an actual rate of use equal to the ratio between the cumulative duration of activity 65 and a total estimated life 67 for an integrated circuit in this mission profile 66.

In other words, the instantaneous state of aging reflects the real aging of the integrated circuit, whereas the presumed state of aging reflects the predicted aging of the integrated circuit in a given mission profile.

The difference between the instantaneous state of aging and the presumed state of aging gives a margin value 69.

This margin 69 is transmitted to the secure processor 6, which updates the state of aging of the integrated circuit on the basis of the margin 69, transmitted 13 to the adjustment circuit (this circuit being formed, notably, by the control 18 of the parameterization circuit 7 in the power supply stage 3) and recorded 15 in the memory 5.

The adjustment circuit of the system on a chip is configured to adjust the operating point of this integrated circuit subsequently in such a way as to optimize its operation within the limit of said operating margin.

In this embodiment, the physical measurements and the evaluation of the states of aging are carried out continuously, in a period of between one microsecond and one second, together with the adjustment of an operating point.

In a variant, the mission profile may be configurable by a user 100, for example in systems on chips designed to execute different missions.

Otherwise, the estimated state of aging is set during the design of the system on a chip SOC so as to correspond to the most constraining mission profile, of the type used in industrial conditions. The calculated margin will be greater if the mission profile is overdesigned, but will have no visible effect on the result of the adjustment of an operating point.

The various embodiments of a system on a chip SOC described above may further comprise break circuits associated with integrated circuits of the system on a chip, configured to detect a hardware malfunction, such as critical path replicas or in-situ sensor-triggers. Said break circuits form an additional part of the monitoring circuit.

In case of malfunction, the break circuits send a warning signal (referred to as a "flag") to the adjustment circuit. The adjustment circuit is configured so that it then adjusts the operating point of the defective integrated circuit to another operating point, called the secure operating point. The secure operating point is, for example, an operating point which is less constraining than the operating point in which the integrated circuit has suffered a malfunction.

Figure 7:
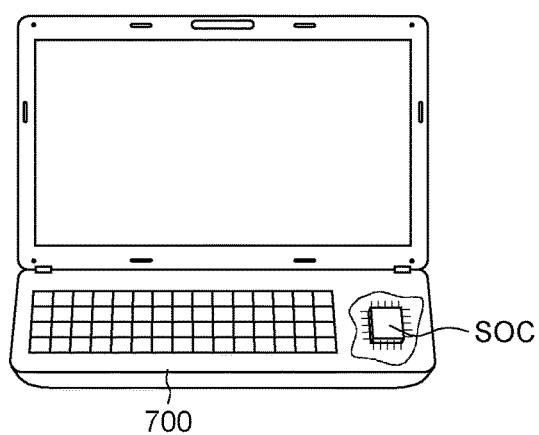
FIGS. 7 and 8 each show an example of a product or apparatus equipped with an embodiment of a system on a chip SOC.
Figure 8:
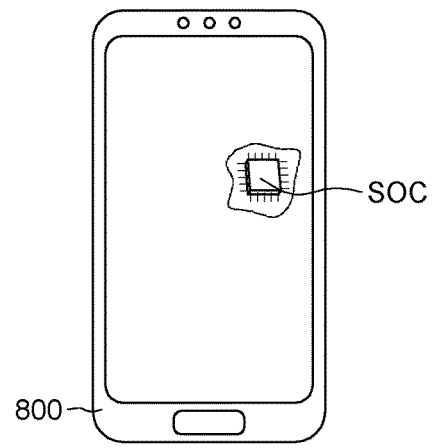

FIGS. 7 and 8 each show an example of a product or apparatus equipped with an embodiment of a system on a chip SOC as detailed above, namely a personal computer 700 and a mobile telephone 800 respectively. It will be apparent to those skilled in the art that the embodiments of a system on a chip SOC detailed above may be used in any other known product not mentioned here.

Clearly, the proposed solution for the management of aging is not limited to the embodiments and applications detailed above, but covers all variants thereof; for example, the passive components or components other than integrated circuits forming the logic of a processor may benefit from such management of their aging.

Additionally, the embodiments and installation described are applied to an operating point of at least one integrated circuit, but, by way of example, numerous operating points of different components of the system on a chip, or a global operating point, or only the most critical operating points, may be managed simultaneously or independently.

The invention claimed is:

1. A method for adjusting at least one operating point of at least one integrated circuit of a system on a chip, the system on a chip comprising a first integrated circuit configured to operate at a first operating point and a second integrated circuit configured to operate at a second operating point, the second operating point being less constraining than the first operating point, the method comprising:
monitoring to acquire at least one cumulative duration of activity of said at least one integrated circuit;
evaluating to establish a state of aging of said at least one integrated circuit on the basis of said cumulative duration of activity; and
adjusting said at least one operating point of said at least one integrated circuit on the basis of said state of aging by changing the first operating point of the first integrated circuit to match the second operating point when the state of aging of the first integrated circuit, equal to the cumulative duration of activity of the first integrated circuit, exceeds a first threshold value.

2. The method according to claim 1, wherein adjusting further comprises changing the second operating point of both the first and second integrated circuits to a third operating point, said third operating point being less constraining than the second operating point, when the states of aging of the first and second integrated circuit, which are equal to the cumulative durations of activity of the first and second integrated circuit respectively, exceed a second threshold value.

3. The method according to claim 1, wherein adjusting comprises an changing operating points by stages.

4. The method according to claim 1, wherein evaluating and adjusting step are executed on each restart of the system on a chip.

5. A method for adjusting at least one operating point of at least one integrated circuit of a system on a chip, comprising:
monitoring to acquire at least one cumulative duration of activity of at least one integrated circuit by acquiring at least one physical parameter representing use of said at least one integrated circuit;
evaluating to establish a state of aging of said at least one integrated circuit on the basis of said cumulative duration of activity by determining at least one instantaneous state of aging of said at least one integrated circuit on the basis of said at least one physical parameter; and
adjusting said at least one operating point of said at least one integrated circuit on the basis of said state of aging by changing said at least one operating point with allowance for at least one operating margin; and
calculating said at least one operating margin of said at least one integrated circuit by comparing said at least one instantaneous state of aging with a presumed state of aging.

6. The method according to claim 1, wherein monitoring to acquire at least one cumulative duration of activity of the at least one integrated circuit comprises monitoring to acquire at least one cumulative duration of activity of the at least one integrated circuit at an operating point defined as critical.

7. A method for adjusting at least one operating point of at least one integrated circuit of a system on a chip, wherein the at least one integrated circuit comprises a first integrated circuit configured to operate at a first operating point, the method comprising:
monitoring to acquire at least one cumulative duration of activity of at least one integrated circuit;
evaluating to establish a state of aging of said at least one integrated circuit on the basis of said cumulative duration of activity; and
adjusting said at least one operating point of said at least one integrated circuit said state of aging, wherein adjusting comprises changing the first operating point of the first integrated circuit to a second operating point, said second operating point being dedicated to the first integrated circuit and less constraining than the first operating point, when the state of aging of the first integrated circuit, equal to the cumulative duration of activity of the first integrated circuit, exceeds a first threshold value.

8. The method according to claim 7, wherein the system on a chip further comprises a second integrated circuit configured to operate at a third operating point, and wherein adjusting comprises changing the third operating point of the second integrated circuit to a fourth operating point, said fourth operating point dedicated to the second integrated circuit and less constraining than the third operating point, when the state of aging of the second integrated circuit, equal to the cumulative duration of activity of the second integrated circuit, exceeds a second threshold value.

9. A method for adjusting at least one operating point of at least one integrated circuit of a system on a chip, comprising:

monitoring to acquire at least one cumulative duration of activity of at least one integrated circuit, wherein monitoring further comprises acquiring a supply voltage applied to said at least one integrated circuit;

evaluating to establish a state of aging of said at least one integrated circuit on the basis of said cumulative duration of activity, wherein evaluating comprises the establishing a state of aging of said at least one integrated circuit on the basis of the cumulative duration of activity and on the basis of at least one supply voltage previously applied to said at least one integrated circuit; and adjusting said at least one operating point of said at least one integrated circuit on the basis of said state of aging.

10. The method according to claim 9, wherein adjusting comprises a changing by stages of said at least one operating point of said at least one integrated circuit to at least one other operating point dedicated to said at least one integrated circuit, said at least one other operating point being less constraining than said at least one operating point.

11. The method according to claim 9, wherein monitoring to acquire at least one cumulative duration of activity of the at least one integrated circuit comprises monitoring to acquire at least one cumulative duration of activity of the at least one integrated circuit at an operating point defined as critical.

12. The method according to claim 5, wherein the acquisition performed during monitoring occurs continuously during the operation of the system on a chip.

13. The method according to claim 12, wherein evaluating and adjusting are executed periodically in real time during the operation of the system on a chip.

14. The method according to claim 12, wherein monitoring to acquire at least one cumulative duration of activity of the at least one integrated circuit comprises monitoring to acquire at least one cumulative duration of activity of the at least one integrated circuit at an operating point defined as critical.

15. A method for adjusting at least one operating point of at least one integrated circuit of a system on a chip, comprising:

monitoring to acquire at least one cumulative duration of activity of at least one integrated circuit, and sending a warning signal in case of a hardware malfunction;

evaluating to establish a state of aging of said at least one integrated circuit said cumulative duration of activity; and adjusting said at least one operating point of said at least one integrated circuit on the basis of said state of aging by changing the operating point of said at least one integrated circuit to a secure operating point in response to said warning signal.

16. The method according to claim 15, wherein monitoring to acquire at least one cumulative duration of activity of the at least one integrated circuit comprises monitoring to acquire at least one cumulative duration of activity of the at least one integrated circuit at an operating point defined as critical.

17. A system on a chip, comprising:

at least one integrated circuit configured to operate at least at one operating point, the at least one integrated circuit comprises a first integrated circuit configured to operate at a first operating point and a second integrated circuit is configured to operate at a second operating point, said second operating point being less constraining than the first operating point;

a monitoring circuit configured to acquire at least one cumulative duration of activity of said at least one integrated circuit;

an evaluation circuit configured to establish at least one instantaneous state of aging of said at least one integrated circuit on the basis of said at least one cumulative duration of activity; and an adjustment circuit configured to adjust said at least one operating point on the basis of said at least one instantaneous state of aging of said at least one integrated circuit by changing the operating point of the first integrated circuit to the second operating point when the state of aging of the first integrated circuit, equal to the cumulative duration of activity of the first integrated circuit, exceeds a first threshold value.

18. The system on a chip according to claim 17, wherein the adjustment circuit is further configured to change the second operating point of the first and second integrated circuits to a third operating point, said third operating point being less constraining than the second operating point, when the states of aging of the first and second integrated circuits, which are equal to the cumulative durations of activity of the first and second integrated circuit respectively, exceed a second threshold value.

19. The system on a chip according to claim 17, wherein the adjustment circuit is configured to change said at least one operating point by stages.

20. The system on a chip according to claim 17, wherein the evaluation circuit and the adjustment circuit are configured to establish the instantaneous state of aging and to change said operating point on each restart of the system on a chip.

21. The system on a chip according to claim 17, wherein the monitoring circuit is configured to acquire the cumulative duration of activity continuously during the operation of the system on a chip.

22. The system on a chip according to claim 17, wherein said system is a component of an apparatus comprising one of a compute or a mobile telephone.

23. The system on a chip according to claim 17, wherein the monitoring circuit acquires the at least one cumulative duration of activity of the at least one integrated circuit at an operating point defined as critical.

24. A system on a chip, comprising:

at least one integrated circuit configured to operate at least at one operating point, wherein the at least one integrated circuit comprises a first integrated circuit configured to operate at a first operating point;

a monitoring circuit configured to acquire at least one cumulative duration of activity of said at least one integrated circuit;

an evaluation circuit configured to establish at least one instantaneous state of aging of said at least one integrated circuit on the basis of said at least one cumulative duration of activity; and an adjustment circuit configured to adjust said at least one operating point on the basis of said at least one instantaneous state of aging of said at least one integrated circuit, and wherein the adjustment serves to adjust the operating point of said first integrated circuit to a second operating point, said second operating point being dedicated to the first integrated circuit and less constraining than the first operating point, when the state of aging of the first integrated circuit, equal to the cumulative duration of activity of the first integrated circuit, exceeds a first threshold value.

25. The system on a chip according to claim 24, wherein the at least one integrated circuit further comprises a second integrated circuit configured to operate at a third operating point, and wherein the adjustment circuit is configured to change the third operating point of the second integrated circuit to a fourth operating point, said fourth operating point dedicated to the second integrated circuit and less constraining than the third operating point, when the state of aging of said second integrated circuit, equal to the cumulative duration of activity of the second integrated circuit, exceeds a second threshold value.

26. A system on a chip comprising:
at least one integrated circuit configured to operate at least at one operating point;
a monitoring circuit configured to acquire at least one cumulative duration of activity of said at least one integrated circuit and to acquire a supply voltage applied to said at least one integrated circuit;
an evaluation circuit is configured to establish at least one instantaneous state of aging of said at least one integrated circuit on the basis of said at least one cumulative duration of activity and on the basis of the supply voltages previously applied to said at least one integrated circuit; and
an adjustment circuit configured to adjust said at least one operating point on the basis of said at least one instantaneous state of aging of said at least one integrated circuit.

27. The system on a chip according to claim 26, wherein the adjustment circuit is configured to change by stages said at least one operating point of said at least one integrated circuit to at least one other operating point dedicated to said at least one integrated circuit, said at least one other operating point being less constraining than said at least one operating point.

28. The system on a chip according to claim 26, wherein the monitoring circuit acquires the at least one cumulative duration of activity of the at least one integrated circuit at an operating point defined as critical.

29. A system on a chip comprising:
at least one integrated circuit configured to operate at least at one operating point;
a monitoring circuit configured to acquire at least one cumulative duration of activity of said at least one integrated circuit and to acquire at least one physical parameter representing use of said at least one integrated circuit;
an evaluation circuit is configured to establish at least one instantaneous state of aging of said at least one integrated circuit on the basis of said at least one cumulative duration of activity and the physical parameter, and to calculate at least one operating margin of said at least one integrated circuit by comparing said at least one instantaneous state of aging with a presumed state of aging; and
an adjustment circuit configured to adjust said at least one operating point on the basis of said at least one instantaneous state of aging of said at least one integrated circuit and on the basis of said at least one operating margin.

30. The system on a chip according to claim 29, wherein the evaluation circuit and the adjustment circuit are configured to calculate said at least one operating margin and to change said at least one operating point periodically in real time.

31. The system on a chip according to claim 29, wherein the monitoring circuit acquires the at least one cumulative duration of activity of the at least one integrated circuit at an operating point defined as critical.

32. A system on a chip, comprising:
at least one integrated circuit configured to operate at least at one operating point;
a monitoring circuit configured to acquire at least one cumulative duration of activity of said at least one integrated circuit, wherein the monitoring circuit comprises break circuits associated with said at least one integrated circuit, the break circuits comprising one of critical path replicas and in-situ sensors configured to send a warning signal to an adjustment circuit in case of hardware malfunction;
an evaluation circuit configured to establish at least one instantaneous state of aging of said at least one integrated circuit on the basis of said at least one cumulative duration of activity; and
wherein the adjustment circuit configured to adjust said at least one operating point on the basis of said at least one instantaneous state of aging of said at least one integrated circuit and to change the operating point of said at least one integrated circuit to a secure operating point in response to said warning signal.

33. The system on a chip according to claim 32, wherein the monitoring circuit acquires the at least one cumulative duration of activity of the at least one integrated circuit at an operating point defined as critical.

* * * * *